United States Patent
Wolf et al.

(10) Patent No.: US 10,166,633 B2
(45) Date of Patent: Jan. 1, 2019

(54) LASER BEAM MACHINE FOR THERMALLY TREATING WORKPIECES WITH A CABLE GUIDANCE SYSTEM HAVING A FITTED DEFLECTION UNIT

(71) Applicant: Messer Cutting Systems GmbH, Gross-Umstadt (DE)

(72) Inventors: Tobias Wolf, Mömlingen (DE); Robert Schröder, Mainz (DE); Thomas Dünzkofer, Gross-Umstadt (DE); Ingo Göller, Gross-Zimmern (DE)

(73) Assignee: Messer Cutting Systems GmbH, Gross-Umstadt (DE)

( * ) Notice: Subject to any disclaimer, the term of this patent is extended or adjusted under 35 U.S.C. 154(b) by 374 days.

(21) Appl. No.: 15/103,852

(22) PCT Filed: Dec. 11, 2014

(86) PCT No.: PCT/EP2014/077320
§ 371 (c)(1),
(2) Date: Jun. 10, 2016

(87) PCT Pub. No.: WO2015/086724
PCT Pub. Date: Jun. 18, 2015

(65) Prior Publication Data
US 2016/0303685 A1    Oct. 20, 2016

(30) Foreign Application Priority Data

Dec. 12, 2013    (DE) .......................... 10 2013 113 912
Mar. 6, 2014    (DE) .......................... 10 2014 102 955

(51) Int. Cl.
*B23K 26/08*    (2014.01)
*B23K 37/02*    (2006.01)
(Continued)

(52) U.S. Cl.
CPC ........ *B23K 26/0876* (2013.01); *B23K 26/128* (2013.01); *B23K 37/0235* (2013.01);
(Continued)

(58) Field of Classification Search
CPC ........... B23K 26/08; B23K 37/02; G02B 6/44
(Continued)

(56) References Cited

U.S. PATENT DOCUMENTS 3,920,980 A * 11/1975 Nath ...................... G02B 6/032
219/121.79
4,707,073 A * 11/1987 Kocher ................... B23K 26/06
219/121.6
(Continued)

FOREIGN PATENT DOCUMENTS

DE    3906571 A1    9/1990
DE    19607327 B4    12/2005
(Continued)

OTHER PUBLICATIONS

Espacenet English Abstract for DE 3906571 A1 published Sep. 6, 1990.
(Continued)

*Primary Examiner* — Samuel M Heinrich
(74) *Attorney, Agent, or Firm* — Tiajoloff & Kelly LLP

(57) ABSTRACT

A laser beam machine has a laser head (3) for emitting a laser beam onto a workpiece which is to be treated, and a movement unit (1, 2, 9) for physically moving the laser head (3), which movement unit has a linearly moving machine portal (1) and a transverse carriage (2) which is held such that it can be moved on said machine portal in a transverse manner, wherein a flexible fiber cable (10) with a minimum permissible bending radius enters at an inlet point on the upper laser head end for transmitting the laser beam, and wherein a cable guidance system (12, 13) is provided in
(Continued)

Figure 1:
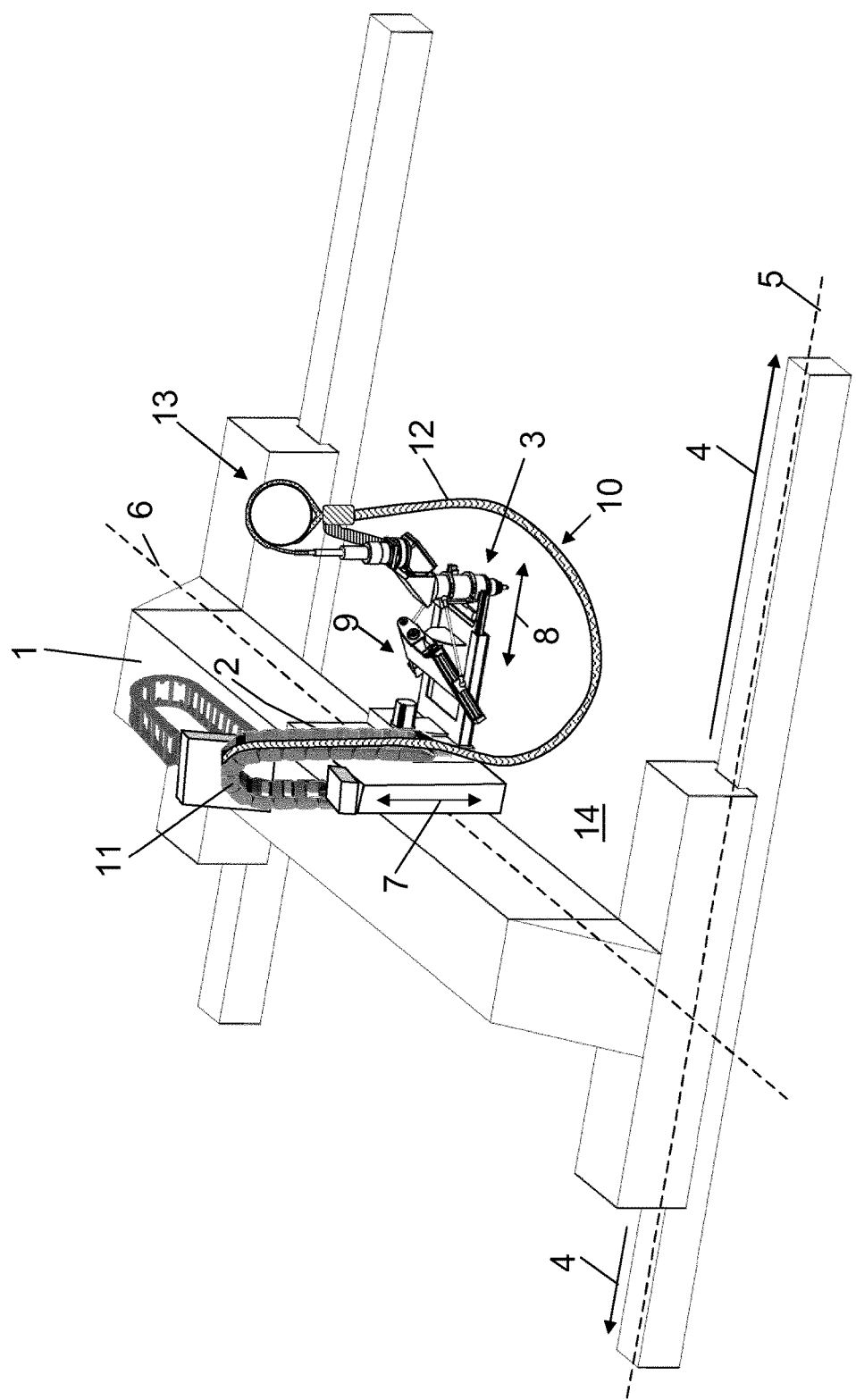

order to guide the fiber cable (10) at least over a portion of its length. In order to provide a laser beam machine proceeding from the above, in which laser beam machine inclined positions of the laser head (3) are also possible without the fiber cable (10) being subjected to excessive loading, the invention proposes that the cable guidance system (12, 13) has a deflection unit (13) which is fitted to the laser head (3) and which prespecifies a flexurally rigid deflection arc which extends above the inlet point and closely adjoins the inlet point, and by means of which deflection arc the fiber cable (10) is guided to the inlet point, and the radius of which deflection arc is greater than the minimum permissible bending radius of the fiber cable (10).

9 Claims, 2 Drawing Sheets

(51) Int. Cl.
  *G02B 6/44* (2006.01)
  *B23K 26/12* (2014.01)
  *B25J 9/02* (2006.01)
  *B25J 19/00* (2006.01)

(52) U.S. Cl.
  CPC ............ *B25J 9/026* (2013.01); *B25J 19/0025* (2013.01); *B25J 19/0037* (2013.01); *G02B 6/44* (2013.01); *G02B 6/4478* (2013.01)

(58) Field of Classification Search
  USPC ........................................ 219/121.63–121.72
  See application file for complete search history.

(56) References Cited

U.S. PATENT DOCUMENTS

| | | | | |
|---|---|---|---|---|
| 4,881,524 | A * | 11/1989 | Boebel | A61B 1/00098 600/108 |
| 5,660,748 | A * | 8/1997 | Tanaka | B23K 26/06 219/121.6 |
| 2002/0164136 | A1* | 11/2002 | Fukuda | C03C 13/04 385/125 |
| 2003/0226835 | A1* | 12/2003 | Bell | B23K 26/10 219/121.78 |
| 2008/0124032 | A1 | 5/2008 | Horvath et al. | |
| 2010/0147810 | A1 | 6/2010 | Campana | |
| 2015/0158124 | A1* | 6/2015 | Kino | G02B 6/44 219/121.78 |

FOREIGN PATENT DOCUMENTS

| | | |
|---|---|---|
| DE | 102010004193 A1 | 7/2011 |
| DE | 102012008122 A1 | 10/2013 |
| JP | H03-291187 A | 12/1991 |
| JP | 2012194355 A | 10/2012 |
| WO | 2012/124335 A1 | 9/2012 |

OTHER PUBLICATIONS

Espacenet English Abstract for DE 10 2010 004193 A1 published Jul. 14, 2011.
Espacenet English Abstract for JP H03-291187 A published Dec. 20, 1991.

* cited by examiner

LASER BEAM MACHINE FOR THERMALLY TREATING WORKPIECES WITH A CABLE GUIDANCE SYSTEM HAVING A FITTED DEFLECTION UNIT

TECHNICAL BACKGROUND

The present invention refers to a laser beam machine, comprising:
a laser head for emitting a laser beam onto a workpiece which is to be treated,
a movement unit for spatially moving the laser head, which movement unit has a linearly moving machine portal on which a transverse carriage is held such that it can be moved in a transverse manner and on which the laser head is mounted,
a flexible fiber cable with a minimum permissible bending radius, which transmits the laser beam to the laser head and thereby enters at an inlet point on the upper laser head end, and
a cable guidance system for guiding the fiber cable at least over a portion of its length.

The thermal treatment using a laser beam machine serves the automated separation, welding, removal, profiling, hardening or marking of workpieces. A laser beam is here moved relative to the surface of the workpiece to be treated.

PRIOR ART

Laser beam machines have a laser source for generating the laser beam and a laser head. The laser beam is supplied from the laser source to said head and directed onto the workpiece to be treated. The housing of the laser head protectively accommodates components required for the focusing of the laser beam.

The relative movement between laser head and workpiece is normally implemented in that the laser head is movable by way of a movement unit in all spatial directions, so that a pattern stored in a machine control is followed in a controlled manner during treatment of the workpiece.

High-power lasers in the form of gas, fiber, disk and diode lasers are used as laser sources, wherein circular polarized or unpolarized laser radiation is predominantly used to avoid any directional dependence in the absorption behavior during contour cuts. In industrial production engineering especially carbon dioxide gas lasers ($CO_2$ lasers), neodymium-doped yttrium-aluminum-garnet lasers (Nd:YAG lasers) and recently oscillators of ytterbium-doped quartz glass are in common use as disk lasers or in fiber form (ytterbium lasers).

Mirror systems or optical waveguides in the form of flexible optical fibers are suited for the transmission of the laser beam to the laser head; fiber optics can normally be handled more easily than mirror systems. The laser beam is here guided within a single optical fiber or in plural optical fibers combined in a bundle to the laser head. In the following, the terms "optical fiber" or "fiber cable" stand for both a single fiber and for a bundle of optical fibers.

The fiber cable is fixed at the upper end of the laser head and follows the transversal and vertical movements thereof. The fiber cable is therefore laid such that it can follow the whole potential movement path of the laser head without falling short of a predetermined minimal bending radius, which would lead to the breakage of the fiber cable.

In the case of small treatment areas or low laser powers, standard cable suspensions are adequate for holding the fiber cable. Additional covers for the mechanical protection of the fiber cable and for the observance of an admissible bending radius may here be provided. Such covers are for instance known from DE 39 06 571 A1.

In high-speed cutting operations, however, mechanical vibrations and great centrifugal forces may arise. These may adversely affect the beam quality and even lead to the breakage of the fiber cable, whereby laser light exits into the environment.

To reduce this risk, DE 196 07 327 B4 suggests a laser beam machine according to the above-mentioned type. This machine comprises a laser source for generating a laser beam, a laser head for thermally treating a workpiece, and a fiber cable for transmitting the laser beam to the laser head. A movement unit serves to move the laser head in a horizontal plane over the workpiece surface and to adjust its vertical distance from the workpiece. For performing the horizontal movement the movement unit comprises a linear guidance system with biaxially serial displacement kinematics, which system allows a translational displacement of the laser head along two displacement axes that are orthogonal to each other and are constructionally designed in the standard way as a movable machine portal with transverse carriage.

The fiber cable extends along the whole linear guidance system up to an inlet point at the upper laser-head end and is supplied in an adequately great free arc to said point. In particularly deformation-intensive length sections it is surrounded by a deformation-limiting, flexible protective sheath laid in a U-shape. The deformation-intensive length sections include the transitions from a stationary point to the movable machine portal and from there to the movable transverse carriage. During the translational movement of the laser head the leg lengths of the U-shaped protective sheath are changing, but not the radius of the U-shape, so that the minimal bending radius of the fiber cable guided therein is also observed during movement of the laser head. Other control, data and supply lines can be housed within the protective sheath, which is also called cable-drag or energy chain.

DE 10 2010 004 193 A1 describes a device for thermally connecting electronic or mechanical components on a circuit board using a laser beam. The circuit board is positioned on a movable planar table in the vicinity of which a laser generator is arranged and on which a deflection optics for the laser beam is disposed. The laser beam is guided by means of a flexible optical waveguide from the laser generator to a collimator which is arranged directly in front of the deflection optics.

The laser beams are aligned in parallel by the collimator and directed onto the substrate. The optical waveguide follows the movement of the deflection optics on the planar table and is laid in loop form in a cable drag.

US 2010/0147810 A1 discloses a CNC laser beam machine with a laser head for emitting a laser beam and a movement unit for the spatial movement of the laser head with linearly moving machine portal and transverse carriage. The laser beam is generated by way of a fiber-laser generator (fiber laser). The fiber laser is enclosed in a plastic protective cover and is guided within an energy chain with a predetermined minimal curvature radius. The plastic protective cover is here fixed at the beginning and at the end of the energy chain to avoid escape of the fiber laser out of the energy chain.

TECHNICAL OBJECTIVE

Laser beam machines which can be used in a flexible way and are e.g. suited for fiber cutting require, however, not only a laser beam directed in orthogonal direction onto the workpiece surface, but also a treatment with obliquely impinging laser beam. It may here be required that the laser head can be tilted relative to the vertical, which entails bending or torsion load on the fiber cable.

It is the object of the present invention to provide a laser beam machine in which inclined positions of the laser head are also possible without the fiber cable being excessively loaded.

GENERAL DESCRIPTION OF THE INVENTION

This object, starting from the laser beam machine of the above-mentioned type, is achieved according to the invention in that the cable guidance system has a deflection unit which is mounted on the laser head and which predetermines a mechanical deflection bow which extends above the inlet point and closely adjoins the inlet point, and by means of which the fiber cable is guided to the inlet point, and the radius of which is greater than the minimum permissible bending radius of the fiber cable.

A deflection unit via which the fiber cable is guided to the laser head is fixed to the laser head of the laser beam machine according to the invention. Due to this fixation the deflection unit also performs all movements of the laser head within the space, specifically also tilting relative to the vertical. The fiber cable arc extending to the inlet point at the upper laser head end is here fixedly predetermined by a mechanical rigid deflection bow. The fiber cable arc is therefore not formed by free arc formation of the cable within the space, as in the known laser beam machine, but the arc is mechanically predetermined and invariable in time. This fiber cable arc is also called "static arc" or "supported arc" in the following—in contrast to the free "dynamic arc" known from the prior art. The static arc has the following advantages:

The position of the fiber cable is mechanically stabilized up to the inlet point into the laser head. Centrifugal forces which may particularly occur during cutting operations with fast directional changes are barred from the fiber cable and are solely removed by the deflection unit.

The bending radius which is predetermined by the mechanical rigid deflection bow can be much smaller than the bending radius which must be conceded to the fiber cable in case of free, dynamic arc formation. The smaller bending radius is less extensive, requires less space and therefore permits a more compact construction. Specifically, it is subjected to a smaller centrifugal acceleration upon directional changes or rotation of the laser head than a free arc with a greater extension.

The movement unit comprises a machine portal which is movable in a longitudinal direction of a work table. The portal-like construction is distinguished by a high mechanical stability and allows a transverse carriage with the laser head mounted thereon to move in a transverse direction (perpendicular to the longitudinal direction). The laser head can thereby be moved by means of the movement unit over the whole area of the work table.

The deflection unit is fastened to the laser head directly or indirectly via one or plural intermediate elements. It comprises the deflection bow which extends at least in part above the inlet point of the fiber cable into the laser head and thereby closely adjoins a vertical at the inlet point, so that the fiber cable when leaving the deflection bow impinges on the laser-head inlet point in a straight extension or at best with a small bend.

For this purpose the deflection bow is preferably designed and arranged in relation to the laser head such that the fiber cable impinges on the deflection bow at a contact point remote from the laser head and extends downwards at a contact point close to the laser head from the deflection bow to the inlet point.

The fiber cable is supplied to the deflection bow from below, guided over the deflection bow and passed downwards at the side of the deflection bow close to the laser head in a more or less straight line or at the most with a slight bend to the inlet point. The deflection bow is here arranged as close as possible to the longitudinal axis of the laser head and thereby ensures a short lateral extension which is as small as possible at a given bending radius (=small lateral extension) of the deflection unit. During a pivotal movement of the laser head about its torch tip, the so-called "tool center point" (TCP), or during a rotation of the laser head about its rotational axis, the fiber cable must therefore follow a shorter movement path.

This is also supported by the fact that the deflection point, as has already been explained further above, predetermines a static radius for the bending of the fiber cable, which can be relatively small and which is preferably in the range of 100 to 150 mm.

The advantage of a small lateral extension of the fiber cable and of the deflection unit is even intensified in a particularly advantageous embodiment of the laser beam machine in which a distance (A) between the contact point remote from the laser head and a beam supply axis extending through the inlet point is smaller than the diameter of the deflection bow.

The beam supply axis is positioned in the tool axis of the laser cutting head. The fiber cable describes here more than only a semicircle around the deflection bow; it describes for instance a three-quarter circle. It does not impinge on the deflection bow at the point which has the maximum distance from the tool axis this would correspond to the diameter of the deflection bow, but it impinges on the deflection bow at a point which is closer to the tool axis, and is then guided around the deflection bow up to the contact point close to the laser head where it leaves the deflection bow again.

Due to the close guidance on the laser head the fiber cable extends close to the rotation point of the tool axis (also called C-axis) and is subjected to a centrifugal force which is as small as possible upon rapid changes of the movement direction.

It has turned out to be useful when the deflection unit comprises a bracket and an adapter, wherein the adapter is fixed via the bracket to the laser head and connects the deflection bow to a protective tube for the fiber cable.

If necessary, the fiber cable may be surrounded by a flexible protective tube, for instance a corrugated tube of metal or plastic. In this tube it is supplied in a protected manner to an adapter which is provided, on the one hand, with a receptacle for the flexible protective tube and, on the other hand, with a receptacle for the rigid deflection bow. Thus the fiber cable passes via the adapter to the deflection bow. The contact point remote from the laser head, which has been mentioned above and at which the fiber cable enters into the deflection bow, is positioned in the adapter or in the direct vicinity thereof.

The adapter itself is held on a bracket which is directly connected to the laser head or indirectly via one or plural intermediate elements such that it also performs all movements of the laser head, especially also tilting from the vertical. Bracket, adapter and deflection bow are here parts of the deflection unit.

Especially with a view to a small lateral extension and a close guidance of the deflection unit on the laser head, it is advantageous when the bracket has a bracket center axis which encloses an angle of less than 30 degrees with the longitudinal axis of the laser head.

Although bracket center axis and longitudinal axis of the laser head (tool axis) do thus not extend in parallel, they converge at an acute angle, which has less influence on the machine dynamics than a bracket projecting laterally away from the laser head at an obtuse angle (of for instance 90 degrees). The "bracket center axis" is here understood as the imaginary straight connection line between the bracket fixation on the laser head and the adapter.

The protective tube extends sectionwise within a movement space which extends in the area between the machine portal and the laser head, and it is here connected with one end to the adapter and with the other end to the machine portal.

The protective tube for the fiber cable is fastened to the transverse carriage of the machine portal and is laid from there loosely in one or more arcs through this movement space. The movement space is positioned at the same side of the machine portal as the workpiece to be treated and the laser head. The fiber cable is guided from there upwards to the adapter. The fiber cable laid in the movement space follows the movements of the laser head. The movement amplitudes are the smaller the closer the fiber cable is guided past the tool axis. In this respect the laying length of the fiber cable within the movement space is as short as possible despite the loose laying.

It has turned out to be advantageous when the protective tube is configured as a flexible ribbed tube of metal and the deflection tube consists of aluminum or a carbon fiber-reinforced material.

The deflection bow preferably has a wall which is configured to be sectionwise tubularly closed and/or sectionwise in cross section in the form of a shell.

The partly closed lateral tube walls help to fix the fiber cable to the deflection bow and to protect it from mechanical damage. In the simplest case the deflection bow consists of two bent side walls which are interconnected via transverse webs or struts.

EMBODIMENT

Figure 3:
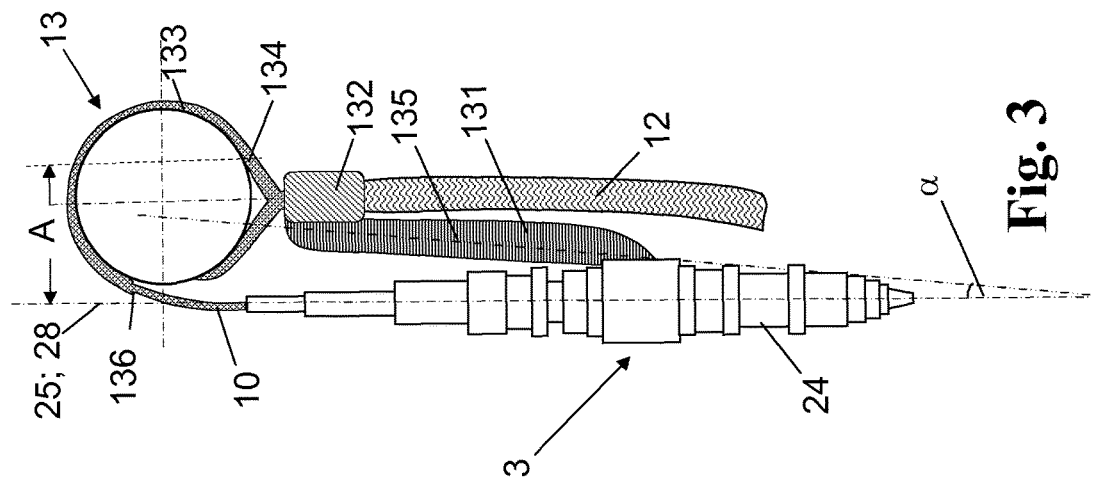

The invention will now be described in more detail with reference to an embodiment and drawings. In a schematic illustration, FIG. 1 shows an embodiment of the laser beam machine according to the invention with a positioning unit and a deflection unit in a three-dimensional view, FIG. 2 shows a section of the laser beam machine with the deflection unit in an enlarged three-dimensional illustration, and FIG. 3 shows the deflection unit in a front view on the laser beam.

The laser beam machine according to the invention is a laser cutting machine in the embodiment and the laser head is configured as a laser cutting torch 3. The laser cutting torch 3 is composed of a beam supply unit 27 and the adjoining laser cutting head 24 proper.

Figure 2:
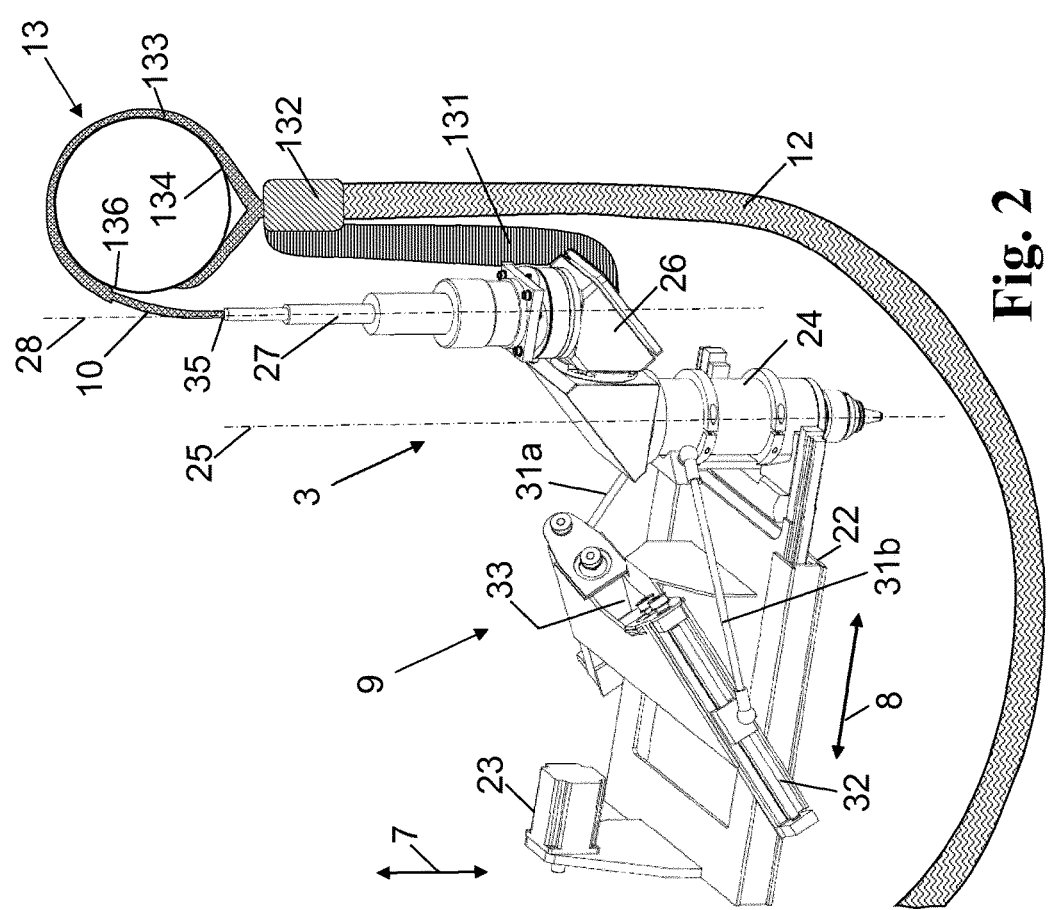

FIG. 1 gives a survey of the movement unit of the laser cutting machine and the supply for the fiber cable to the laser cutting torch 3.

The basic components and functions of the movement unit are known from DE 10 2012 008 122 A1. It comprises a machine portal 1 and a transverse carriage 2 on which the laser cutting torch 3 is mounted. Machine portal 1 and transverse carriage 2 are movable along the two linear axes 5, 6 which are orthogonal to each other. The laser cutting torch 3 is movable independently thereof by means of a linear guidance system 9 with a displacement kinematics along the displacement axes 7 and 8 (directional arrows 7; 8) in two spatial directions. Along the lift axis 7 the laser cutting torch 3 can be lifted or lowered for adjusting the height. The displacement axis 8 extends in parallel with the linear axis 5 (directional arrows) of the movement unit and is thus redundant thereto. Both displacement axes 7; 8 extend perpendicular to the linear axis 6, so that small movements of the laser cutting torch 3 can be performed in the direction of the redundant axes 5 by the linear guide system via a displacement along the displacement axis 8. Great movements of the laser cutting torch 3 along said axis are assumed by the machine portal 1.

The laser cutting machine has an ytterbium fiber laser (not shown in the figure). The ytterbium fiber laser emits radiation of a working wavelength of about 1070 nm with a high laser power (several kW). The laser beam is guided via a fiber cable 10 to the laser cutting torch 3. The fiber cable 10 is configured as a flexible optical individual fiber which is provided with a plastic covering for protection against mechanical load. The free minimal bending radius of the fiber cable upon dynamic load is specified to be 200 mm.

The fiber cable 10 passes via an energy chain 11, which is mounted on the transverse carriage 2, downwards into a movement space 14 in which the laser cutting torch 3 and the workpiece to be treated (not shown) are also positioned. On this cable section the fiber cable 10 is covered by a protective tube 12 of metal with corrugated profile for additional mechanical protection and is supplied in an arc to a deflection unit 13, which shall be explained in more detail hereinafter with reference to FIG. 2. To achieve a movement of the fiber cable 10 within the movement space that is as minimal as possible, the cable is guided as close as possible along the tool axis. The energy chain 11 is therefore arranged such that one leg is fixed to the transverse carriage 2 and the other leg is fixed to the linear guidance system 9 of the movement unit of the laser head. The energy chain 11 thereby performs the movements of the laser head not only in the vertical (z-direction) and the movement direction of the transverse carriage 2 (y-direction), but also in x-direction. The laying length of the fiber cable 10 in the movement space 14 can thereby be kept short and the fiber cable can be guided as close as possible along the tool axis.

FIG. 2 shows the linear guidance system 9 on an enlarged scale. It has a biaxially serial displacement kinematics which allows a displacement of the laser cutting torch 3 along the displacement axes 7 and 8. A telescopic unit 22 which is configured in the manner of a drawer that is displaceable via a drive 23 is provided for a movement along the displacement axis 8. At its distal end the drawer is fork-shaped and forms a pivot joint for the laser cutting head 24. In addition, two struts 31a, 31b of invariable length are connected to the laser cutting head 24 via ball joints. The struts 31a, 31b are movably supported along slide axes by means of slides 32; 32b, each of which has a drive. The slide axes enclose an angle of 53° with each other and generate a plane which extends tilted by an angle of 36° relative to the displacement direction 8.

The tool center point is the focus of the laser beam which is normally positioned on the surface of the workpiece to be treated or slightly thereunder. Upon change of the orientation of the laser cutting head 24 the tool center point can be held in an approximately spatially fixed manner, assisted by the linear guidance system.

To avoid a collision with the linear guidance system upon tilting of the laser cutting head 24 in the direction of the bearing arrangement, the laser cutting torch 3 comprises a beam deflection unit 26 which guides the laser beam to the laser cutting head 24. A beam supply axis 28 extends through the beam deflection unit 26 and, offset thereto, a tool symmetry axis 25 through the laser cutting head 24 (symmetry axis of the laser cutting head). This offset arrangement results in a smaller extension of the laser cutting head 24 in the direction of the symmetry axis of the laser cutting head and in a reduced space requirement of the laser cutting head 24. As a result, the laser cutting head 24 can pass into the indentation 33 upon tilting, which on the whole allows a great tilt angle and a large work area for the laser cutting head 24.

The great freedom of movement of the laser cutting head 24 is promoted according to the invention by a special way of the supply of the fiber cable 10 by using a deflection unit 13, which shall be explained in more detail hereinafter.

The deflection unit 13 comprises a metallic holding bracket 131 which is fastened to the laser cutting torch 3, a metallic adapter 132 which is held by the holding bracket, and a deflection bow 133 of carbon fiber-reinforced material. It consists essentially of two bent side cheeks which are interconnected via webs on the underside. The side cheeks have a wall thickness of 2 mm. The deflection bow 133 is so rigid that in view of the normally occurring mechanical loads it ensures the constructionally predetermined bending radius of 150 mm. The adapter 132 is provided at its lower end with a receptacle for the protective tube 12 and at its upper end with a receptacle for the deflection bow 133.

The holding bracket 131 extends at an acute angle from the laser cutting head 24 obliquely upwards, as shall be explained in further detail with reference to FIG. 3. The fiber cable 10 is guided out of the protective tube 12 via the adapter 132 over the static deflection bow 133 and from there in an almost straight line to an inlet point 35 of the beam supply unit 27. Due to the connection to the laser cutting head 24 the deflection unit 13 also performs all movements of the laser cutting head 24 within the space without the shape of the deflection bow 133 being changed thereby.

The lateral cheeks of the deflection bow 133 guide the fiber cable 10 and protect it against mechanical damage. The upper outlet end of the deflection bow 133 closely adjoins the inlet point 35 of the fiber cable 10 into the beam supply unit 27 in the sense that after departure from the deflection bow 133 it extends almost in a straight line to the inlet point 35.

Due to the co-moved and constructionally statically predetermined deflection bow 133 the position of the fiber cable 10 up to the inlet point 35 is mechanically stabilized, namely also upon tilting of the laser cutting head 24 relative to the vertical. Centrifugal forces caused by fast directional changes of the laser cutting head 3 are barred from the fiber cable 10 and removed by the deflection unit 13.

Moreover, the bending radius predetermined by the mechanical rigid deflection bow 133 can be made much smaller in the embodiment 150 mm than the bending radius which must be conceded to the fiber cable in the case of free arc formation (at least 200 mm are here standard). Since the smaller bending radius is less extensive laterally, it requires less space and allows a more compact construction. Specifically, it is subjected to a smaller centrifugal acceleration upon directional changes or rotation of the laser cutting head 24 than would be the case with a free fiber-cable arc with a larger lateral extension. In this respect, too, the forces acting on the fiber cable 10 are kept small.

The fiber cable 10 impinges at a contact point 134 remote from the laser cutting head (this is the inlet point into the deflection bow 133; in FIG. 2, it is concealed by the wall of the deflection bow 133) on the deflection bow 133 and extends at a contact point 136 close to the laser cutting head (this is the outlet point out of the deflection bow 133) from the deflection point 133 to the inlet point 35 of the fiber cable almost in a straight line downwards.

FIG. 3 is a front view on the laser cutting torch 3, the bent laser cutting head 24 and the deflection unit 13. In this view the beam supply axis 28 and the tool symmetry axis 25 extend one after the other.

The fiber cable 10 is guided around the deflection bow 133 up to the contact point 136 close to the laser cutting head, at which it leaves the deflection bow again. The fiber cable 10 describes a three-quarter circle around the deflection bow 133 from the deflection-arc inlet point 134 up to the outlet point 136.

The center axis 135 of the holding bracket 131 encloses an acute angle α of less than 30 degrees with said axes 25; 28. The deflection bow 133 has a diameter of 230 mm (radius: 115 mm) and is arranged as close as possible to the axes 25 and 28. This manifests itself in that the distance A between the axes 25, 28 and the contact point 134 remote from the laser cutting head is smaller than the diameter of the deflection bow 133. The distance is 200 mm in the embodiment.

Hence, the fiber cable 10 impinges on the deflection bow 133 at the deflection-arc inlet point 134 which is not at a maximum distance from the laser cutting head 24. Since the fiber cable 10 impinges on the deflection bow 133 at a point closer to the laser cutting head 24, the fiber cable 10 and the protective tube 12 are guided as close as possible to the axes 25; 28 of the laser cutting head 24 and the pivot point of the tool axis (C-axis). As a result, the fiber cable 10 is subjected to smaller mechanical loads caused by centrifugal forces upon fast motional changes and to a small torsion upon rotation of the laser cutting head 24.

The invention claimed is:

1. A laser beam emitting machine comprising:
   a laser head emitting a laser beam onto a workpiece that is to be treated,
   a movement unit spatially moving the laser head, movement unit having a linearly moving machine portal on which a transverse carriage is supported such that said carriage can be moved transversely, and the laser head being mounted on said carriage,
   a flexible fiber cable with a minimum permissible bending radius, said fiber cable transmitting the laser beam to the laser head and entering therein at an inlet point on an upper laser head end thereof, and
   a cable guidance system guiding the fiber cable at least over a portion of a length thereof,
   wherein the cable guidance system has a deflection unit that is mounted on the laser head and that predetermines a rigid deflection curve that extends above the inlet point and adjacent to the inlet point, and guides the fiber cable to the inlet point, and has a radius that is greater than the minimum permissible bending radius of the fiber cable.

2. The laser beam machine according to claim 1, wherein the fiber cable enters the deflection curve at a first contact point spaced from the laser head and extends downwards from the deflection curve to the inlet point at a second contact point close to the laser head.

3. The laser beam machine according to claim 2, wherein the deflection curve has a radius in a range of 100 to 150 mm.

4. The laser beam machine according to claim 2, wherein a distance between the first contact point remote from the laser head and a laser-head longitudinal axis extending through the inlet point is smaller than a diameter of the deflection curve.

5. The laser beam machine according to claim 1, wherein the deflection unit comprises a bracket and an adapter that is fixed via the bracket to the laser head and connects the deflection curve to a protective tube on the fiber cable.

6. The laser beam machine according to claim 5, wherein the bracket has a bracket center axis that with a laser-head longitudinal axis encloses an angle of less than 30 degrees.

7. The laser beam machine according to claim 5, wherein the protective tube extends sectionwise within a movement space defined between the machine portal and the laser head, wherein the protective tube is connected with an end thereof to the adapter and with another end thereof to the transverse carriage.

8. The laser beam machine according to claim 5, wherein the protective tube is a flexible ribbed tube of metal and the deflection curve is of aluminum or a carbon fiber-reinforced material.

9. The laser beam machine according to claim 1, wherein the deflection curve has a wall that is configured to be sectionwise tubularly closed and/or sectionwise in cross section in the form of a shell.

\* \* \* \* \*